United States Patent [19]

Yu

[11] Patent Number: 4,722,978

[45] Date of Patent: Feb. 2, 1988

[54] ALLYL TERMINATED MACROMOLECULAR MONOMERS OF POLYETHERS

[75] Inventor: Simon Hsiao-Pao Yu, North Ridgeville, Ohio

[73] Assignee: The B. F. Goodrich Company, Akron, Ohio

[21] Appl. No.: 771,093

[22] Filed: Aug. 30, 1985

[51] Int. Cl.$^4$ .................. C08G 65/32; C08G 65/04
[52] U.S. Cl. ......................... 525/403; 525/404; 525/918; 528/421; 564/292; 564/294; 568/674; 568/675
[58] Field of Search .............. 528/421; 525/404, 403, 525/918; 568/674, 675; 564/292, 294

[56] References Cited

U.S. PATENT DOCUMENTS

| | | | |
|---|---|---|---|
| 3,417,034 | 12/1968 | Hoy | 528/421 |
| 3,850,856 | 11/1974 | Dreyfuss | 528/421 |
| 4,393,199 | 7/1983 | Manser | 528/421 |
| 4,456,773 | 6/1984 | Fock | 568/608 |

FOREIGN PATENT DOCUMENTS 4915480 4/1974 Japan.

*Primary Examiner*—Joseph L. Schofer
*Assistant Examiner*—Peter F. Kulkosky
*Attorney, Agent, or Firm*—Alan D. Lobo; Alan A. Csontos

[57] ABSTRACT

A cationic ring-opening polymerization of a cyclic ether ("CE") in conjunction with an unsaturated alcohol (propagator) having an allyl double bond, produces a polyether macromer having an allylic group near one end and a hydroxyl group at the other. The polymerization proceeds by polyaddition of the CE to the OH group which is the propagating species. The CE is an alkylene oxide or an aliphatic or aromatic glycidyl ether; the propagator is a primary or secondary alcohol which, if cyclic may have a single internal double bond in one ring. The catalyst is a Friedel-Crafts acid, strong protic organic or inorganic acid, oxonium salt, or the like. The macromer formed may be homopolymerized to yield a polyvinyl homomacromer with pendant chains of polymerized CE; or the CE may be copolymerized with a wide variety of olefinically unsaturated monomers to form a macromer copolymer; or, plural cyclic ethers may be (a) sequentially polymerized to form macromer block copolyethers, or, (b) polymerized randomly to form macromer copolyether copolymers. The cationically ring-opened macromer formed always contains a trace of a cyclic oligomer of the CE.

12 Claims, No Drawings

ALLYL TERMINATED MACROMOLECULAR MONOMERS OF POLYETHERS

BACKGROUND OF THE INVENTION

This invention relates to macromolecular monomers ("macromers" for brevity) of polyethers having a vinyl functional "head" group at one end, through which the macromer is polymerizable with a copolymerizable monomer, and a terminal hydroxyl (OH) group at the other end. The polymerization of the macromer generates a polymacromer with a polyvinyl backbone having polyether branches thus resulting in a graft or comb copolymer. Such polymerization of the macromer of this invention, to form comb copolymers, differs from graft copolymerization in the sequence of formation of the backbone relative to the formation of the graft unit.

The macromer is formed by cationic ring-opening polymerization of a cyclic ether ("CE") in conjunction with an alkenyl alcohol which functions as the generator of the propagating species, and a suitable cationic ring-opening catalyst. The alkenyl alcohol (referred to as the "propagator" because it functions as the propagating species (OH group) generator in the presence of a cationic initiator) may be substituted with substituents which do not interfere with the initiation, propagation and transfer reactions which generate the macromer in a polymerization which has the characteristics of a living polymerization. The macromer has substantially uniform molecular weight (mol wt) distribution such that the ratio of the weight average mol wt (Mw) to the number average mol wt (Mn) is not substantially above about 3, preferably less than 2.

It is to be noted that the macromers of this invention are formed by cationic ring-opening and not carbocationic polymerization, though both are classified as cationic polymerizations and often use the same cationic initiator. The cationic ring-opening involves the opening of strained rings of cyclic monomers and the propagating species is an oxonium, sulfonium or ammonium ion; carbocationic polymerization involves substituted olefinic monomers where the propagating species is a carbenium ion.

Numerous macromers of polytetrahydrofuran (polyTHF) have been synthesized by "living" cationic ring-opening polymerization involving an acrylic end group, inter alia, all by end-capping. But acrylic double bonds are quite different from allylic double bonds, and acrylic monomers are not cationically polymerizable (see *Principles of Polymerization* by G. Odian, Chap. 3, Table 3.1, McGraw Hill, New York 1970). Thus, hydroxyalkyl acrylates and methacrylates are unique chain transfer agents which are not cationically polymerizable (see U.S. Pat. No. Re. 31,468). There was no reason to expect that a monohydroxyl-terminated allyl propagator would remain intact under the conditions suitable for a cationic ring-opening polymerization.

To avoid the side reactions which interfere with the use of olefinic monomers, U.S. Pat. No. 4,327,201 to Kennedy and Fritsch teaches the formation of a poly(isobutylene) macromer with the use of vinyl benzyl halide and an allylic halide in conjunction with a variety of Lewis acid catalysts suited for cationic polymerization. In a later publication, Kennedy & Lo indicate concern over loss of a head group during synthesis, and found a specific catalyst which would avoid such loss. (see "Macromers by Carbocationic Polymerization II. An Improved Synthesis of Polyisobutenylstyrene and its Copolymerization with Methyl Methacrylate and Styrene" *Polym. Reprint* 23, No. 2 September '82).

Much effort has been directed to the preparation of various OH-terminated difunctional and polyfunctional polyethers by cationic ring-opening polymerization of a CE in conjunction with water or an alcohol or a diol or a polyol as disclosed in U.S. Pat. Nos. 3,129,232; 3,305,565; 3,850,856; 4,284,826; 4,077,991; 3,419,532; 3,402,169; 3,269,961; inter alia.

U.K. Patent Appln. No. 2,021,606A and U.S. Pat. No. 4,431,845 teach that OH-terminated poly(chloroalkylene ethers) have not proven entirely satisfactory when prepared by cationic ring-opening polymerization as disclosed in U.S. Pat. Nos. 3,850,856; 3,910,878; 3,3910,879; and, 3,980,579. Thus, the problems inherent in the use of prior art catalysts referred to in the foregoing U.S. patents have been documented. A solution to the problems was provided in the aforementioned U.S. Pat. No. 4,431,845. This solution was to use a catalyst comprising (i) a fluorinated acid catalyst having the formula $H_mXF_{n+m}$ wherein X is selected from boron, phosphorus, arsenic and antimony, m is 0 or 1, and n is 3 when X is boron and n is 5 when X is phosphorus, arsenic and antimony, and, (ii) a polyvalent tin compound.

This patent reference teaches that only tin fluorometallic compounds even among other Group IV metals, has a peculiar catalytic action not attributable to Group V fluorometallic compounds. With this catalyst, it is suggested that any aliphatic OH-containing material such as a monomeric or polymeric mono- or polyhydric alkanol, haloalkanol or polymeric glycol having up to 6 OH groups, whether terminal or pendant, may be used in the formation of a polymer with an alkylene oxide, provided at least about 50% by weight (wt) of the alkylene oxide is a chloroalkylene oxide.

The reaction of a CE with an ethylenically unsaturated alcohol in the presence of a cationic catalyst is disclosed in U.S. Pat. Nos. 3,627,022 and 3,419,621 to yield a monoadduct, the addition of a single cyclic ether (oxirane) unit to the alcohol.

U.S. Pat. No. 4,485,211 to Okamoto discloses the use of a hydroxyl-containing material (HCM) having a single OH propagating site to form block copolymers of polyethers. The HCM may be an alkylene glycol such as ethylene glycol, or a prepolymer with plural OH propagating sites, such as poly(glycidyl ether) with 2 sites. U.S. Pat. No. 4,451,618 to Okamoto discloses the use of a hydroxyl-terminated prepolymer (HTP) with one or more OH end groups which also yield polyether block copolymers. With the emphasis on the essentiality of the OH propagating sites and the routine use of saturated end groups, the possibility that a vinyl group, and more specifically, an allylic end group might survive the conditions of cationic ring-opening polymerization simply escaped notice. In view of the large number of olefinically unsaturated monomers which undergo polymerization (see the list in *Carbocationic Polymerization* by Kennedy, J. P. and Marechal, E., Table 3.6, pp 37 et seq., John Wiley & Sons 1982) the fate of the double bond of the propagator seemed speculative.

SUMMARY OF THE INVENTION

It has unexpectedly been found that, under particular conditions, a cationic ring-opening polymerization of a cyclic ether ("CE") in conjunction with an ethylenically ("allylically") unsaturated alcohol and a cationic ring-opening catalyst, produces a polyether macromer having an allylic group near one end and a hydroxyl (OH) group at the other. An allylic group is one which is characterized by having adjacent, optionally substituted, carbon atoms neither of which has bonds to an oxygen atom. The allylic group of the alcohol does not undergo carbocationic polymerization under the acidic conditions required for the cationic ring-opening polymerization of the CE used. The polymerization proceeds by polyaddition of the CE to the OH group which is the propagating species.

It is therefore a general object of this invention to provide a process for the manufacture of a polyether macromer having an allylic group near one end and a hydroxyl group at the other, comprising, polymerizing (A) a cationically ring-openable cyclic ether selected from the group consisting of
(i) at least one alkylene oxide having the structure

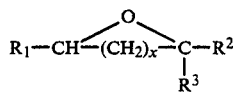  (I)

wherein, x is an integer in the range from 0 to about 4, except that when x>1, a second alkylene oxide having x=1 or 0 must be present, and $R^1$, $R^2$ and $R^3$ are independently selected from the group consisting of hydrogen, $C_1-C_{20}$ alkyl (having from 1 to about 20 carbon atoms) and haloalkyl, and, $C_6-C_{20}$ aryl and aralkyl, and, at least one of $R^1$, $R^2$, and $R^3$ is hydrogen; and (ii) an aliphatic or aromatic glycidyl ether having the structure

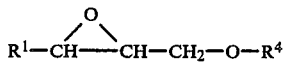  (II)

wherein $R^1$ has the same connotation as hereinabove; and, $R^4$ represents a member selected from the group consisting of a substituted group such as a hydrocarbon group, i.e. $C_1-C_{20}$ alkyl or substituted alkyl, particularly haloalkyl, alkoxyalkyl, aryl (Ar) or substituted aryl (Ar—Q), particularly wherein Q represents $C_1-C_{10}$ alkyl, or haloalkyl; and, (B) a monoolefinically unsaturated primary or secondary alcohol represented by a structure selected from the group consisting of

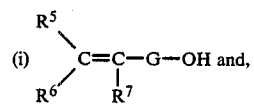  (III)

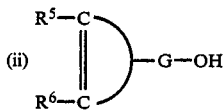  (IV)

wherein, G, if present, is a spacer selected from the group consisting of branched or linear alkyl, aralkyl, haloalkyl, haloaralkyl, alkoxyl and aralkoxyl, each having from 1 to about 20 carbon atoms ($C_1-C_{20}$); and, $R^5$, $R^6$ and $R^7$ are independently selected from the group consisting of hydrogen, $C_1-C_{20}$ alkyl (having from 1 to about 20 carbon atoms) and haloalkyl, and, $C_6-C_{20}$ aryl and aralkyl;

in the presence of an effective amount of
(C) a cationic initiator selected from the group consisting of Friedel-Crafts acids, relatively strong protic organic and inorganic acids, oxonium salts and stable carbenium ions;
so as to produce a macromer having the structure

  (V)

wherein R represents the residue of said monoolefinically unsaturated alcohol,

M represents the residue of at least one said cyclic ether which is ring-opened, and, m represents an integer in the range from 2 to about 500, more preferably from 2 to about 100.

It has further been found that a macromer block copolyether may be prepared by polymerizing plural cyclic ethers sequentially, or by using a macromer of this invention as a propagator, so as to have the structure

  (VI)

wherein M' and M" represent two ring-opened cyclic ethers, and, m' and m" are integers each in the range from 1 to about 300 such that m'+m"=m.

It has also been found that a macromer random copolymer may be prepared by polymerizing a polyether macromer V or VI with an olefinically unsaturated monomer so as to have the structures

  (VIIa)

and,

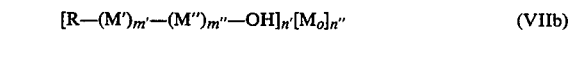  (VIIb)

wherein $M_o$ represents the olefinically unsaturated monomer;

n' represents an integer in the range from 1 to about $10^4$, preferably $1-10^3$ and refers to the number of pendant OH-terminated polyether chains;

n" represents an integer in the range from 1 to about $10^5$, more preferably $1-10^4$; and, R, M, M', M", m, m' and m" have the same connotation as before.

It is a specific object of this invention to provide an essentially linear polyether macromer having allylic and OH chain ends, and substantially uniform molecular weight distribution such that its ratio of Mw/Mn is not above about 3.0, and preferably less than 2.0.

It is another specific object of this invention to provide polyurethanes by cross-linking with the terminal OH groups on pendant polyether chains; such pendant chains are present when V or VI are polymerized to yield a polymer (VIIa, b) with a polyvinyl backbone.

It is also a specific object of this invention to provide a macromer with a ring-openable olefinically internally unsaturated alcohol such as 5-norbornene-2-methanol as the propagator so that the ring is the head group for a macromer formed with any first monomer identified hereinabove, and thereafter, by metathesis polymerization, polymerizing the macromer with a suitable ring-openable cyclic olefin (second monomer) to form a copolymer with pendant chains of the first monomer. The second monomer preferably has not more than one double bond, and not more than one double bond in each ring, such as cyclopentene, dicyclopentadiene, dihydrocyclopentadiene, norbornene (NB), and substituted NBs.

Still other specific objects of this invention are to provide (a) a poly(haloepoxide) macromer which may be quaternized to yield antistats, fiber softeners, excipients for drugs and biomimetic agents; and, (b) poly(siloxane-ether) block copolymer surfactants and foam stabilizers.

DETAILED DESCRIPTION OF PREFERRED EMBODIMENTS

The cationic ring-opening polymerization disclosed herein occurs because of the specific acid catalysts used with the monoolefinically unsaturated alcohol used to function as a chain propagator for the ring-openable cyclic ether ("CE"). This reaction was not expected to produce the macromer of this invention because it was not realized that the allyl bond of the alcohol would not interfere with the CE to be ring-opened by the catalyst. Macromers of this invention have a Mn in the range from about 200 to about 3000 though even higher mol wts up to about 10,000 may be formed, if desired. The term "macromer" is used herein to denote at least one of the above-specified ring-opened CE with an "allylic", that is, ethylenically unsaturated as defined, head group. If the macromer is formed from a single CE it is referred to as a "homomacromer"; if from more than one comonomer which appears randomly, it is referred to as a "macromer copolymer"; and, if a copolymer is specifically formed by sequential copolymerization, it is referred to as a "macromer block copolyether".

To facilitate this ring-opening polymerization with living characteristics so that the allylic head group survives the reaction without forming an excessive amount of cyclic oligomers and other undesired byproducts so as to make the reaction uneconomical, it is essential that one use (i) a catalytic amount of a catalyst (initiator) which, though not narrowly critical, is preferably boron trifluoride ($BF_3$) or tin tetrachloride ($SnCl_4$); or borontrifluoride etherate complexes; or, a fluorinated metallic acid catalyst having the formula $HMF_6$ wherein M is selected from P, As or Sb; or, an oxonium salt of the acid; or, oxonium salts of tetrafluoroboron or antimony hexafluoride; and, (ii) an "allylic" alcohol with structure (III) or (IV) which is at least partially soluble, and more preferably, is completely soluble in the reaction mass, with or without a solvent.

If the CE and the alcohol are not mutually soluble, or soluble in a mutual co-solvent, the polymerization will not proceed satisfactorily. The higher the solubility, generally the better the polymerization reaction. The reaction is most preferably carried out in a bulk polymerization in a simple and convenient manner.

Typically, the CE (I) or (II) and the alcohol (III) or (IV), each of which is moisture-free, are charged to a jacketed glass-lined reactor provided with a mechanical agitator and fitted with a thermoprobe and condenser. The reactor is purged with nitrogen and warmed to the polymerization temperature. The catalyst, for example, triethyloxonium hexafluorophosphate (TEOP) dissolved in methylene chloride is dripped in and the temperature of the reaction mass is controlled to provide a satisfactory rate of polymerization by raising or lowering the temperature of the circulating medium in the jacket.

The polymerization is generally carried out at a temperature in the range from about 25°–50° C. but this range is not critical, some polymerizations proceeding satisfactorily at as low as 0° C., or lower, and others at as high as 90° C., or higher. The progress of the reaction is monitored by measuring total solids. Upon completion, the polymerization is terminated with aqueous sodium bicarbonate solution, and an antioxidant such as Goodrite ®3114 is added, and the temperature of the mixture raised to about 60° C. and maintained for about an hour. The liquid macromer is separated from the aqueous phase and washed with distilled water at room temperature. Unreacted monomer, if any, may be removed by distillation under vacuum.

The conversion to the macromer and its mol wt are controlled by the ratio of the monomer to the alcohol, according to the following equation:

$$Mn = \left[ \frac{Monomer, g}{Alcohol, g} + 1 \right] \times mol\ wt\ of\ alcohol \times \%\ total\ solids$$

About 0.1–0.5 g of TEOP is used per kg of monomer when allyl alcohol is the alcohol used. The amount of sodium bicarbonate used as a short-stop is about three times the amount of TEOP. The amount of antioxidant added is about 0.2% by wt of the macromer. It is essential that all reactants be moisture-free because each molecule of water, if present, will initiate a polymer terminated with OH groups at both ends of the chain.

The macromer is characterized by gel permeation chromatography (GPC) analysis at 40° C. using a Water's 200 with columns packed with Styragel. THF is used as carrier solvent. All mol wts are calibrated relative to polystyrene. Cyclic oligomers, if present, and they usually are in a small amount in the range from a trace, that is about 10 ppm to about 10% by wt or more, are excluded from the calculation of mol wts. The presence of cyclic oligomers provides a "fingerprint" of a macromer formed by cationic ring-opening; a macromer of identical structure, if prepared by anionic polymerization will be free of cyclic oligomers. Examples of macromers of polyethers prepared by anionic polymerizations are found in Japan 70 28,786 (Chem. Absts. 74, 14138r (1971); Japapn 74, 15,480; and U.S. Pat. No. 3,875,202.

FT infrared spectra were recorded with a Nicolet 7199 spectrometer. Samples were prepared by applying a thin coat of macromer on a KBr crystal.

Carbon-13 NMR spectra were obtained at 20.1 MHz using a Bruker WP-80 spectrometer. Macromers were examined as a 20 wt% solution in benzene-$d_6$ or chloroform-d with internal tetramethylsilane reference at 30° C.

Proton NMR spectra were obtained at 200.13 MHz in chloroform-d at 30° C. using a Bruker WH-200 spectrometer. Trichloroacetylisocyanate was used as a derivatizing agent for the OH group analysis.

Mass spectra were obtained with a Varian MAT 311A mass spectrometer in the field desorption mode. Samples were dissolved in either methanol or THF. The solution was then saturated with solid LiBr so that the lithiated molecular ions [MLi]+ were produced during analysis.

Glass transition temperature ($T_g$) is determined by a Perkin-Elmer DSC-2 differential scanning calorimeter at a 40° C./min heating rate under helium.

Hydroxyl number (OH No.) was determined by acetylation with an acetyl anhydride-pyridine mixture according to a standard procedure and the end point is determined by automatic titration. The OH No. is defined as the milligram equivalent of KOH per gram of the macromer, where a mole of KOH is equivalent to one mole of OH group.

Iodine number was determined based on the addition of iodine monochloride to the olefinic double bond. The excess iodine monochloride was then determined by titration with thiosulfate. $I_2$ No. is defined as the grams of $I_2$ absorbed per 100 g of macromer.

The halogen, for example, chlorine content is measured by a modified Shoniger method and used to calculate the number of epichlorohydrin ("ECH") units in the macromer.

Among the alkylene oxides having structure (I) which may be used are (i) 1,2-epoxides such as ethylene oxide, propylene oxide, cis- and trans- but preferably cis-butene-2-oxide, cis- and trans-pentene-2-oxide, cis- and trans-hexene-2-oxide, cis- and trans-hexene-3-oxide, and the like; (ii) 1,3-epoxides such as oxetane; and (ii) haloalkyl epoxides (epihalohydrins) such as 1-chloro-2,3-epoxypropane (ECH), 1-bromo-2,3-expoxypropane (epibromodydrin), 1-chloro-2,3-epoxybutane, 1-iodo-2,3-epoxyhexane, 3-chloro-4,5-epoxyoctane, 1-chloro-2,3-epoxycyclohexane, 1-bromo-2,3-epoxymethylbutane, 2-chloro-2-methyl-3,4-epoxypentane, and the like. 1,4-epoxides such as tetrahydrofuran ("THF"), 1,5-epoxides such as tetrahydropyran ("THP"), and 1,6-epoxides such as oxepane ("OXP") do not form homomacromers with allylic head groups. THP does not even form copolymers with 1,2- or 1,3-epoxides, but THF and OXP do. The copolymers of THF or OXP with 1,2- or 1,3-epoxides are random.

Among the aliphatic or aromatic glycidyl ethers having structure (II) which may be used, are methyl glycidyl ether, ethyl glycidyl ether, methylethyl glycidyl ether, butyl glycidyl ether, 2-ethylhexyl glycidyl ether, phenyl glycidyl ether and the like.

Among the monoolefinically unsaturated "allylic" alcohols having the structure (III) which may be used, are relatively short chain alcohols having from 3 to about 6 carbon atoms such as allyl alcohol, 2-methyl-2-propene-1-ol (2-methallyl alcohol), 2-buten-1-ol (crotyl alcohol), 1-buten-3-ol (1-methallyl alcohol), 3-buten-1-ol, 4-penten-1-ol, 2-pentene-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexene-1-ol, 2-methyl-1-penten-3-ol, 2-methyl-4-penten-3-ol, 4-methyl-3-penten-1-ol, and the like; relatively long chain alcohols having from 7 to about 20 carbon atoms such as 9-decen-1-ol, 10-undecen-1-ol (10-undecylenyl alcohol), and naturally occurring citronellol or oleyl alcohol; arylalcohols in which the OH group is on the sidechain such as cinnamyl alcohol, and those in which the OH group is a phenolic OH group such as 2-allylphenol; and, monoadducts of a single CE unit to the above mentioned "allylic" alcohols, such as 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloromethyl ethyl allyl ether, and the like.

Among the allylic cyclic alcohols having the structure (IV) which may be used are those in which the olefinic bond is in the ring which may be a single or fused ring structure having from 5 to 10 carbon atoms, such as for example, 2-cyclohexene-1-ol, 3-cyclohexen-1-methanol, 6,6-dimethyl bicyclo[3.3.1]hept-2-ene-2-ethanol[(1S)-(−)-Nopol], 5-norbornene-2-methanol, and bicyclo[2.2.2]oct-5-ene-2-methanol.

In the more preferred embodiments of this invention the macromer is formed with a head group derived from any desired "allylic" alcohol and an oligomer which may be (i) a homopolymer of a 1,2-epoxide, or 1,3-epoxide; or (ii) a copolymer of a 1,2-epoxide and/or 1,3-epoxide (OXT) and/or 1,4-epoxide (THF) and/or 1,6-epoxide (OXP); or (iii) a homopolymer of a glycidyl ether (II); or (iv) a copolymer of (II) and a 1,2-, 1,3-, 1,4- or 1,6-epoxide. Random copolymers are formed by simply mixing the monomers, while block copolymers are formed by the sequential addition of the monomers.

The macromer is formed by the action of a cationic ring-opening catalyst identified hereinabove with the "allylic" alcohol (III) or (IV) and the alkylene oxide (I) or (II), under mild reaction conditions, namely a temperature in the range from about 0° C. to about 150° C., and more preferably from about 25°–80° C., at ambient or slightly elevated pressure.

The catalyst is used in an amount sufficient to initiate the polymerization. It is most preferred to use a cyclic or acyclic oxonium salt which may be primary, secondary or tertiary. The cyclic oxonium salt may be prepared by reaction of an acyclic oxonium salt with THF. It is most preferred to use a trialkyloxonium or other oxonium salt of the $HMF_6$ acid prepared as described in U.S. Pat. No. 3,585,227. The amount of catalyst used is not critical, from about 0.001 part to about 1 part per 100 parts by wt of oxirane reactants, and more preferably from about 0.01 to about 0.1 part, being generally sufficient. It is desirable, both for economic reasons and for control of the reaction, to keep the amount of catalyst used as low as possible.

The amount of catalyst used has very little effect on the mol wt of the macromer formed, but affects the rate, which in turn affects the temperature of the reaction. Most polymerizations proceed satisfactorily with about 0.05 parts of catalyst per 100 parts of CE. The mol wt is controlled by the ratio of alkylene oxide or glycidyl ether to allylic alcohol. Because the polymerization proceeds via polyaddition a designed (desired) mol wt may be obtained. If the mol wt of a macromer is kept relatively low by including from about 2 to about 8 repeating units, the linear macromer is formed substantially free of cyclic oligomers, but at least a trace of cyclic oligomers is always found in practice. Most preferred linear macromers have a Mn in the range from about 200 to about 3000.

A homomacromer of polyepichlorohydrin (PECH) with an allylic head group is conveniently prepared using allylic alcohol and ECH and conducting the polymerization reaction in bulk at about 30° C. Infrared, nmr and FD mass spectroscopy, GPC, liquid chromatography (LC), and chemical analyses for chlorine and OH number confirmed the structure of the macromer as being represented by

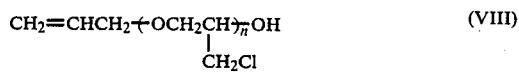
(VIII)

wherein n is in the range from 2 to about 100.

As is well known, reactive liquid polymers (RLPs) referred to hereinbelow, are used as tougheners for unsaturated polyester resin systems because they co-cure with the polyester in addition to contributing to the ease with which it can be handled; the macromers of this invention are used in an analogous manner, as tougheners, to provide further options for tailoring the properties of the system. The macromers are also used as a base for the formulation of perfumes.

The homomacromer (VIII) and other macromers having the general structure (V) are particularly useful as non-aqueous dispersants for sterically stabilized dispersion polymerizations because the terminally unsaturated head group serves to anchor the dispersant by copolymerization with the monomer (for example, arcylic acid) which is to be polymerized. In such polymerizations, shortly after initiation of polymerization, polymer begins to precipitate from the solution and forms aggregates which interfere with the reaction by retarding access of monomer to free radicals. This contributes to poor removal of heat and several related problems. The macromer interferes with formation of the aggregates and the viscosity of the reaction mass is substantially reduced. The effectiveness of the macromer (VIII) as a dispersant in a dispersion polymerization of acrylic acid in benzene is illustrated in Example 20 hereinbelow.

Macromers of this invention may be homopolymerized by conventional methods such as by free radical polymerization effected with a lower alkyl peroxide and the like, so as to form a polyvinyl polymer with pendant polyether chains; and, they are also used as comonomers in a variety of polymerization reactions with conventional vinyl, acrylic, or diene monomer in which the allylic head group is copolymerizable.

For example, the monomer (I) is copolymerizable with (a) a $C_2$-$C_{12}$ vinyl monomer such as vinyl chloride, vinyl acetate, acrylonitrile, ethylene, propylene, 4-vinylpyridine, vinylpyrrolidone, styrene, 4-chlorostyrene, and the like; (b) a $C_3$-$C_{10}$ monomer such as an unsaturated carboxylic acid or its ester, such as acrylic acid, methacrylic acid, acrylic amide, butyl acrylate, ethyl acrylate, 2-ethylhexyl acrylate, and the like, (c) a $C_4$-$C_{20}$ acyclic or cyclic alkadiene monomer such as butadiene, isoprene, cyclopentadiene, or dicyclopentadiene,—(a), (b) and (c) each being free radical polymerizable; and (d) a $C_5$-$C_{20}$ cycloalkene like cyclopentene, cycloheptene, bicyclo(2.2.1)-hept-2-ene, namely NB, which may have acyclic or cyclic (spiro) substituents such as alkyl NB, cycloalkyl NB, phenyl NB, and the like.

When the macromer (VIII) is copolymerized with ethyl acrylate the random copolymer is represented by the structure

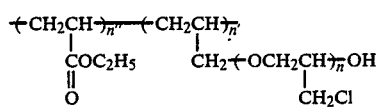

When macromer (VIII) is copolymerized with styrene the random copolymer is represented by the structure

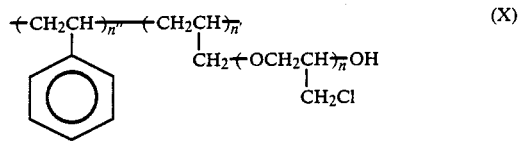

By varying the ratio of conventional vinyl, acrylic, or diene to ECH monomer, and the number of ECH units in the macromer, each of the copolymers may be obtained with a wide range of properties ranging from hard plastic to soft elastomeric.

The macromer is also copolymerizable with reactive liquid polymers (RLPs) such as those having the structure

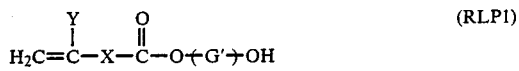

wherein Y is H or alkyl, X is zero, alkylene or arylene, and G' is a polymeric backbone comprising units of at least one epihalohydrin, optionally together with at least one other epoxide; or, the structure

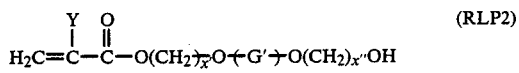

wherein $x'$ and $x''$ are each in the range from 2 to 10, and,

Y and G' have the same connotation as that given hereinabove. Preparation of the RLPs is set forth in detail in U.S. Pat. Nos. Re. 31,469 and 31,468 respectively, the disclosures of which are incorporated by reference thereto as if fully set forth herein.

When the macromer (VIII) is copolymerized with the RLP1 the copolymer is represented by the structure

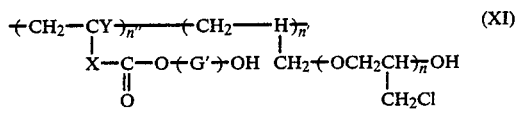

with the backbone terminated conventionally.

In an analogous manner macromer (VIII) may be copolymerized with RLP2 to yield a macromer copolymer having the structure

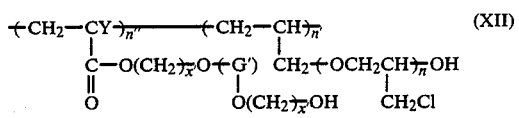

and by varying the ratio of vinyl or acrylic monomer units to the number of PECH units, each of the copolymers may be obtained with a wide range of properties ranging from from hard plastic to soft elastomeric.

Such macromer copolymers are formed by conventional methods, for example, the aforementioned free radical polymerization process. These macromer copolymers with a profusion of pendant OH groups connected to a polyvinyl backbone, are useful in the production of tailored polyurethanes by reaction with organic isocyanates.

Where only two homomacromers or macromer block copolyethers are connected by a diisocyanate so as to have terminal allylic groups, the urethane macromer may be used for crosslinking a wide variety of olefinically unsaturated monomers. Quite unexpectedly, the macromer of this invention behaves in a manner analogous to one with an acrylic head group as disclosed in U.S. Pat. Nos. 3,850,770; 3,960,572; 4,367,302; and 4,377,679, pertinent portions of which are incorporated by reference thereto as if fully set forth herein.

After the macromer (VIII) is quaternized (aminated), it is particularly useful in the preparation of quaternized oligomers for water treatment and other applications such as antistats and dispersants. Amination of the chloromethyl groups in PECH with a wide variety of aliphatic and aromatic amines is known to produce the corresponding ammonium salt which provides cationic charges and imparts hydrophilicity to the polymer. Thus, the normally hydrophobic PECH oligomer is converted to a hydrophilic polymer, but a polymer with both hydrophilic and hydrophobic characteristics is difficult to obtain. The ability to control these properties allows one to 'fabricate' water-treatment chemicals.

The animated macromer has the structure

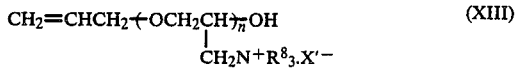

wherein X' represents a halogen, n is an integer in the range from 2 to 100, and R⁸ represents the residue of an amine used to aminate the macromer.

Because high mol wt quaternized polymers are most preferred for water treatment, and such polymers are aminated only with difficulty, it is particularly convenient to prepare the macromer in a mol wt which is sufficiently high to be easily and essentially completely animated, then homopolymerize the macromer (XIII) to produce a polyvinyl polymer with a profusion of substantially fully aminated pendant chains. Such polymers having a Mw in the range from about 100,000 to about 200,000 are effective coagulants, and those in the range from about 500,000 to about 1,000,000 are effective flocculants. It is well known that commercially available Hydrin ® and Herchlor ® PECH elastomers in such desirably high mol wt ranges are animated with difficulty, and then only to an unsatisfactory extent.

The macromer (VIII) in which the OH group is end-capped with an end-capping unit, for example, acrylonitrile, may be block-polymerized with a silyl hydride-terminated polysiloxane to provide an especially effective superwetting agent. The end-capping group is not critical and a variety of esterification and etherification reactions can be used to cap the terminal OH groups, as for example disclosed in U.S. Pat. Nos. 2,998,409 and 33,507,927; British Pat. Nos. 748,856; 848,660; 869,323; 877,256; 911,959; inter alia; or, by reacting with an alkylisocyanate as in British Pat. No. 924,259; or, by reacting with diazomethane as in British Pat. No. 894,439.

The end-capped macromer is represented by

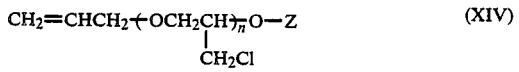

wherein Z is the residue of an end-capping unit.

In the particular instance when the end-capping unit is an acrylonitrile residue, the structure of the end-capped homomacromer is represented by

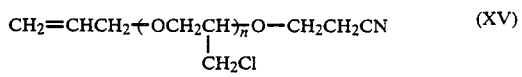

The organohydrosiloxane reactant may be a mono-, di-, or polyhydrosiloxane containing more than two Si-bonded H atoms, wherein any valences of Si not bonded to H or to O in a Si to O to Si bond are bonded to a monovalent hydrocarbon or halaohydrocarbon group, such as those disclosed in greater detail in U.S. Pat. No. 4,150,048 to Schilling et al, the disclosure of which is incorporated by reference thereto as if fully set forth herein. Particularly preferred organohydrosiloxanes have a Si-bonded H at each end as shown by the formula

in which R" is an unsubstituted or halogen-substituted monovalent hydrocarbon group and z is an integer in the range from 0 to about 300, more preferably 5 to 50.

The block copolymer is formed under addition reaction conditions, preferably at elevated temperature from about 50°–100° C. in the presence of a non-reactive solvent, and catalyzed by a neutral Pt-containing hydrosilation catalyst such as that described in U.S. Pat. No. 3,220,972, or Pt metal deposited on charcoal, used in concentrations disclosed in U.S. Pat. No. 3,507,815, namely from 0.001 to about 5% by wt of the reactants.

The macromer block copolymer formed may be represented by the formula

wherein A' represents the residue of a polysiloxane block (XVI) and A" represents the residue of a polyether block of end-capped macromer (XV) after it has been aminated.

EXAMPLES 1–4

In the following 4 illustrative examples the macromer (VIII) was made as described hereinbefore, in a nitrogen atmosphere, with moisture-free reactants charged to a glass-lined reactor, and TEOP catalyst in CH₂Cl₂ is dripped into the reactor. The amount of catalyst is varied in Examples 1 and 2, all other reaction conditions being kept the same; in Examples 3 and 4 the ratio of ECH to allyl alcohol (AA) is varied to obtain a targeted mol wt Mn. The polymerization temperature was controlled at 30°–35° C. with an ice-bath and overnight reactions were carried out at room temperature (20° C.).

TABLE I

|  | Ex. 1 | Ex. 2 | Ex. 3 | Ex. 4 |
| --- | --- | --- | --- | --- |
| Targeted Mn | 550 | 550 | 1000 | 2000 |
| ECH, wt., kg | 1.0 | 1.0 | 0.496 | 0.340 |
| moles | 10.8 | 10.8 | 5.4 | 3.7 |
| AA, wt., kg | 0.125 | 0.125 | 0.029 | 0.0097 |
| moles | 2.2 | 2.2 | 0.50 | 0.17 |
| Ratio ECH/AA, mole | 5.0 | 5.0 | 10.7 | 22. |
| wt. | 8.0 | 8.0 | 17.1 | 35.1 |
| TEOP, wt., g | 0.6 | 0.9 | 0.25 | 0.20 |
| wt. % | 0.053 | 0.080 | 0.048 | 0.057 |
| Time of rxn, hr | 24 | 24 | 5 | 24 |

TABLE I-continued

|  | Ex. 1 | Ex. 2 | Ex. 3 | Ex. 4 |
|---|---|---|---|---|
| Conversion, % | 97 | 100 | >97 | 98 |

The resulting macromer from each of the 4 runs set forth as Examples 1–4 in the Table I hereinabove was analyzed. The results are set forth in Table II hereinbelow:

TABLE II

|  | Ex. 1 | Ex. 2 | Ex. 3 | Ex. 4 |
|---|---|---|---|---|
| $M_n$ |  |  |  |  |
| from GPC | 615 | 614 | 977 | 1830 |
| from OH No. | 559 | 534 | 1025 | 2200 |
| from $I_2$ No. | 554 | 558 | 1100 | — |
| from stoich | 505 | 510 | 1040 | 2010 |
| GPC $M_w$ | 792 | 797 | 1528 | 3330 |
| Ratio $M_w/M_n$ | 1.29 | 1.30 | 1.6 | 1.8 |
| OH No. titration | 100. | 105. | 54. | 25. |
| Iodine No. | 45.8 | 45.5 | 23 | — |
| Visc.*, cps @ 25 | 775 | 846 | 10460 | 22000 |
| $T_g$, by DSC, °C. | −59 | −57 | −42 | −39 |
| % cyclic oligomers | <1 | <1 | <1 | 10 |

*viscosity herein, and in all following illustrative examples is Brookfield viscosity measured @ 25° C.

In the following Examples 5–8 a homomacromer (V) wherein M is a repeating unit of a single CE, was made in an analogous manner by bulk polymerization of each of the following 1,2-epoxides: propylene oxide (PO), n-butyl glycidyl ether (BGE), dodecylene oxide (DO) and trifluoroethyl glycidyl ether (TFEGE), respectively. In each case, allyl alcohol is used as the unsaturated alcohol which provides the OH group as the propagating species. The polymerization conditions are set forth in Table III herebelow. The targeted $M_n$ is calculated on the basis of 90% total solids.

TABLE III

|  | Ex. 5 | Ex. 6 | Ex. 7 | Ex. 8 |
|---|---|---|---|---|
| Monomer | PO | BGE | DO | TFEGE |
| wt., g | 101. | 537. | 55.2 | 35. |
| moles | 1.74 | 4.12 | 0.30 | 0.22 |
| AA, wt., g | 12. | 63. | 2.9 | 2.0 |
| moles | 0.21 | 1.08 | 0.05 | 0.03 |
| TEOP, g | 0.13 | 1.10 | 0.25 | 0.01 |
| wt. % | 0.12 | 0.18 | 0.43 | 0.03 |
| Targeted $M_n$ | 492 | 498 | 1047 | 967 |
| Rxn temp. °C., | 30 | 35 | 35 | 30 |
| Time of rxn, hr | 4 | 26 | 8 | 6 |
| Total solids, % | 73 | 92 | 83 | 77 |

The resulting homomacromer from each of the 4 runs set forth as Examples 5–8 in Table III hereinabove was analyzed. The results are set forth in Table IV hereinbelow. All homomacromers are low viscosity liquids having a Brookfield visc @ 25° C. of <100 cps. Each is insoluble in water but soluble in toluene, heptane and methanol.

TABLE IV

|  | Ex. 5 | Ex. 6 | Ex. 7 | Ex. 8 |
|---|---|---|---|---|
| Homomacromer of | PO | BGE | DO | TFEGE |
| $M_n$ |  |  |  |  |
| from GPC | 639 | 521 | 1510 | 757 |
| from OH No. | 524 | 555 | 1508 | 657 |
| from $I_2$ No. | 469 | 754 | 1204 | 907 |
| $M_w/M_n$ | 1.43 | 1.41 | 1.41 | 3.29 |
| $T_g$, by DSC, °C. | −87. | −93. | −52. | −70. |
| OH No. | 107 | 101 | 37 | 85 |
| Iodine No. | 54 | 34 | 21 | 28 |

TABLE IV-continued

|  | Ex. 5 | Ex. 6 | Ex. 7 | Ex. 8 |
|---|---|---|---|---|
| % cyclic oligomers | 5.6 | <1 | 1.9 | <1 |

In a manner generally analogous to that described hereinabove, a homomacromer of oxetane ($M_n = 400$) as prepared with allyl alcohol providing the OH group is the propagating species.

In the following illustrative Examples 9–12, a macromer copolymer (V) wherein M represents a repeating unit of at least two randomly connected CEs M' and $M_o$, is made by bulk polymerization of a mixture of the monomers under conditions analogous to those described hereinabove. Each of the copolymers includes ECH as a comonomer and any one of ethylene oxide (EO), propylene oxide (PO), tetrahydrofuran (THF) and oxepane (OXP); and the copolymers are identified as follows: (EO/ECH); (PO/ECH); (THF/ECH); and, (OXP/ECH) in Examples 9–13 respectively, the latter being oxirane comonomers. The conditions of polymerization are set forth in Table V herebelow.

TABLE V

|  | Ex. 9 | Ex. 10 | Ex. 11 | Ex. 12 |
|---|---|---|---|---|
| Macromer co'mer | EO/ECH | PO/ECH | THF/ECH | OXP/ECH |
| Monomer | EO | PO | THF | OXP |
| wt., g | 35. | 35. | 100. | 50. |
| moles | 0.79 | 0.69 | 1.39 | 0.50 |
| Comonomer | ECH | ECH | ECH | ECH |
| wt., g | 65. | 64. | 50. | 25. |
| moles | 0.70 | 0.69 | 0.54 | 0.27 |
| Comonomer/monomer | 1.13 | 0.87 | 2.57 | 1.85 |
| AA, wt., g | 11.6 | 11.6 | 6.2 | 3.1 |
| moles | 0.2 | 0.2 | 0.11 | 0.05 |
| TEOP, g | 0.15 | 0.13 | 0.6 | 1.0 |
| wt. % | 0.13 | 0.12 | 0.38 | 1.28 |
| Targeted $M_n$ | 503 | 498 | 1317 | 1317 |
| Rxn temp. °C., | 0 | 30 | 20 | 35 |
| Time of rxn, hr | 7 | 30 | 7 | 72 |
| Total solids, % | 55 | 55 | 56 | 87 |

The resulting macromer copolymer from each of the 4 runs set forth as Examples 9–12 in Table V hereinabove was analyzed. The results are set forth in Table VI hereinbelow.

TABLE VI

|  | Ex. 9 | Ex. 10 | Ex. 11 | Ex. 12 |
|---|---|---|---|---|
| Macromer co'mer | EO/ECH | PO/ECH | THF/ECH | OXP/ECH |
| $M_n$ |  |  |  |  |
| from GPC | 463 | 441 | 1340 | 1230 |
| from OH No. | 392 | 379 | 872 | 722 |
| from $I_2$ No. | 446 | 403 | 1004 | 1716 |
| $M_w/M_n$ | 1.30 | 1.35 | 3.4 | 2.6 |
| Brookfield visc. | <100 | <100 | 1200 | 2000 |
| $T_g$, by DSC, °C. | −79. | −83. | −25. | −78. |
| OH No. | 143 | 148 | 64 | 78 |
| Iodine No. | 57 | 63 | 25 | 15 |
| % cyclic oligomers | 3.4 | <1 | 1.4 | 1.9 |

In the following illustrative Examples 13–15, a macromer copolymer (V) wherein M represents a repeating unit of at least two randomly connected CEs M' and $M_o$, is made by bulk polymerization of a mixture of the monomers under conditions analogous to those described hereinabove. The following macromer copolymers of THF and OXP with EO and PO, specifically identified as THF/EO, THF/PO and OXP/PO respectively are prepared under the specific conditions of polymerization which are set forth in the following Table VII.

TABLE VII

|  | Ex. 13 | Ex. 14 | Ex. 15 |
|---|---|---|---|
| Macromer co'mer | THF/EO | THF/PO | OXP/PO |
| Monomer | THF | THF | OXP |
| wt., g | 28. | 55. | 50. |
| moles | 0.39 | 0.77 | 0.50 |
| Comonomer | EO | PO | PO |
| wt., g | 50. | 44.6 | 43.5 |
| moles | 1.14 | 0.77 | 0.75 |
| Comonomer/monomer | 0.34 | 1.0 | 0.67 |
| AA, wt., g | 12. | 6.5 | 4.35 |
| moles | 0.21 | 0.11 | 0.07 |
| TEOP, g | 1.5 | 0.9 | 1.1 |
| Macromer co'mer | THF/EO | THF/PO | OXP/PO |
| wt. % | 1.67 | 0.85 | 1.12 |
| Targeted Mn | 392 | 856 | 1176 |
| Rxn temp. °C., | 5 | 5 | 10 |
| Time of rxn, hr | 7 | 5 | 25 |
| Macromer co'mer | THF/EO | THF/PO | OXP/PO |
| Total solids, % | 69 | 76 | 51 |

The resulting macromer copolymer from each of the 3 runs set forth as Examples 1-15 in Table VII hereinabove was analyzed. The results are set forth in Table VIII hereinbelow.

TABLE VIII

|  | Ex. 13 | Ex. 14 | Ex. 15 |
|---|---|---|---|
| Macromer co'mer | THF/EO | THF/PO | OXP/PO |
| Mn |  |  |  |
| from GPC | 705 | 1260 | 863 |
| from OH No. | 456 | 1029 | 526 |
| from $I_2$ No. | 488 | 958 | 969 |
| Mw/Mn | 1.7 | 2.3 | 1.7 |
| Brookfield visc. | <100 | 140 | 120 |
| $T_g$, by DSC, °C. | −95. | −91. | — |
| OH No. | 123 | 55 | 107 |
| Iodine No. | 52 | 27 | 26 |
| % cyclic oligomers | 9 | 6 | 6 |

In a manner analogous to that described hereinabove, the following macromer copolymers are prepared with allyl alcohol providing the head group and OH propagating species:
ECH/THF; ECH/OXP; ECH/n-BGE; ECH/THF/OXP; and ECH/OXP/n-BGE.

Homoacromers and macromer copolymers prepared as illustrated in the foregoing examples show characteristic absorption at about 3450 cm$^{-1}$ (broad) assigned to the terminal hydroxyl group and at 1650 and 3080 cm$^{-1}$ to the C=C stretching of the terminal allyl group by FT infrared spectroscopic analysis. The terminal allyl group of the macromers is also detected by proton and carbon-13 nmr:

|  | $CH_2$=CH—$CH_2$O— |  |  |
|---|---|---|---|
| $^1$H nmr, ppm | 5.3(d) 5.2(d) | 5.9(m) | 4.0(d) |
| $^{13}$C nmr, ppm | 116 | 136 | 72 |

FD mass spectra of these macromers also show a series of species with their molecular weight corresponding to polymers possessing one unit of the allyl group and a terminal OH group. For homomacromers, their mol wts correspond to [allyl alcohol+(monomer)$_m$] in structure (V); for macromer copolymers, their mol wts correspond to [allyl alcohol+(monomer)$_{m'}$+(monomer)$_{m''}$] corresponding to structure (VI).

In the following Examples 16-19 a PECH homomacromer (VIII) wherein M is a repeating unit of ECH, is made in a manner analogous to that described hereinbefore with the following allylically unsaturated alcohols, 2-methyl-2-propene-1-ol (2MP); undecenyl alcohol (UA); cinnamyl alcohol (CA); and, allyl phenol (AP), respectively, which provide the head group for each homomacromer. The polymerization conditions are set forth in Table IX hereinbelow. The targeted Mn is calculated on the basis of 90% total solids.

TABLE IX

|  | Ex. 16 | Ex. 17 | Ex. 18 | Ex. 19 |
|---|---|---|---|---|
| Unsatd. alcohol | 2MP | UA | CA | AP |
| wt., g | 10.71 | 22.1 | 18.2 | 6.2 |
| moles | 0.15 | 0.13 | 0.14 | 0.05 |
| ECH, wt., g | 89.3 | 78. | 81.7 | 27.9 |
| moles | 0.97 | 0.84 | 0.88 | 0.3 |
| TEOP, g | 0.075 | 0.125 | 0.075 | 0.026 |
| wt. % | 0.07 | 0.12 | 0.08 | 0.08 |
| Targeted Mn | 606 | 694 | 663 | 664 |
| Rxn temp. °C., | 32 | 35 | 35 | 33 |
| Time of rxn, hr | 7 | 7 | 8 | 6 |
| Total solids, % | 93 | 93 | 87 | 67 |

The resulting homomacromer from each of the 4 runs set forth as Examples 16-19 in Table IX hereinabove was analyzed. The results are set forth in Table X hereinbelow. All the foregoing homomacromers are relatively low viscosity liquids. The Brookfield visc @ 25° C. of some of the homomacromers is stated.

TABLE X

|  | Ex. 16 | Ex. 17 | Ex. 18 | Ex. 19 |
|---|---|---|---|---|
| Unsatd. alcohol | 2MP | UA | CA | AP |
| Mn |  |  |  |  |
| from GPC | 790 | 903 | 806 | 529 |
| from OH No. | 671 | 834 | 559 | 528 |
| from $I_2$ No. | 730 | — | 937 | 416 |
| Mw/Mn | 1.4 | 1.3 | 1.5 | 7.5 |
| Brookfield visc. | 1000 | 500 | 1140 | — |
| $T_g$, by DSC, °C. | −58. | −71. | −57. | −50. |
| OH No. | 84 | 67 | 100 | 106 |
| Iodine No. | 35 | — | 27 | 61 |

FT infrared spectra and proton nmr spectra of PECH homomacromers in Examples 16-19 show characteristic absorption and chemical shifts corresponding to the allylic unsaturated group of the starting alcohol. FD mass spectra of these macromers also show a series species with their mol wts corresponding to [alcohol+(ECH)$_m$] as shown in structure (V).

It is to be noted that only primary and secondary alcohols provide the desired macromers, and tertiary alcohols do not. For example, when 2-methyl-3-butene-2-ol is used under polymerization conditions analogous to those used hereinabove, no allylic unsaturation is detected in the polymer obtained.

EXAMPLE 20

PECH homomacromer (VIII) as a dispersant in the precipitation polymerization of acrylic acid in benzene:

To a 2 liter jacketed glass reactor equipped with a reflux condenser and a stirrer, are charged 230 g of acrylic acid, 25.5 g of (VIII) prepared as in Ex. 2 hereinabove, 1.73 g of allyl pentaerythritol as a cross-linking agent, and 1245 g of benzene as solvent. The reactor is gradually heated from room temperature while agitating and bubbling nitrogen through the reaction mass. 0.28 g of lauroyl peroxide are added to serve as the free radical initiator when the reaction mass reached 70° C., and the reactor was allowed to reach 80° C. After 4.5 hr the reactor was commenced and it was cooled to room temperature.

The foregoing reaction was repeated under identical conditions except that no homomacromer was added.

The Brookfield viscosity of the reaction mass at 25° C., without the macromer, was 400 cps; for the reaction mass in which the macromer was added the viscosity was 150 cps.

The reaction mass was dried at 100° C. under 26″ vcuum for 16 hr with a rotary evaporator. A total of 209 g of fine powder polymer was obtained. 50 g of the powder was washed with benzene three times. Analysis shows the powder has a 2.2 wt % Cl content corresponding to incorporation of 6.4 wt% of the homomacromer.

The small homomacromer content of the poly(acrylic acid) does not vitiate the effectiveness of the polymer as a thickener in aqueous solutions. Only 1% by wt of the polymer in water produces a Brookfield viscosity @ 25° C. of 25° C. of 128,000 cps and a pH of 7.6. The polymer produced without the macromer, used at the same 1% by wt, has a viscosity of 129,000 and a pH of 7.5. It is evident that there is no loss in effectiveness of the polymer, but there is a highly desirable improvement in the polymerization conducted as described.

What is claimed is:

1. A process for the manufacture of a polyether macromer having an allylic group at one end and a hydroxyl group at the other, comprising, polymerizing
   (A) a cationically ring-openable cyclic ether selected from the group consisting of
   (i) at least one alkylene oxide having the structure

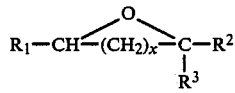
(I)

wherein, x is an integer in the range from 0 to about 4, except that when x>1, a second alkylene oxide having x=1 or 0 must be present, and,
$R^1$, $R^2$ and $R^3$ are independently selected from the group consisting of hydrogen, $C_1$-$C_{20}$ alkyl (having from 1 to about 20 carbon atoms) and haloalkyl, and, $C_6$-$C_{20}$ aryl and aralkyl, and, at least one of $R^1$, $R^2$, and $R^3$ is hydrogen; and (ii) an aliphatic or aromatic glycidyl ether having the structure

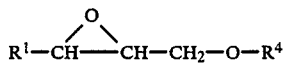
(II)

wherein $R^1$ has the same connotation as hereinabove; and, $R^4$ represents a member selected from the group consisting of, $C_1$-$C_{20}$ alkyl or substituted alkyl, haloalkyl, alkoxyalkyl, aryl (Ar), substituted aryl (Ar-Q), wherein Q represents $C_1$-$C_{10}$ alkyl, haloalkyl; and, (B) a monoolefinically unsaturated primary or secondary alcohol represented by a structure selected from the group consisting of

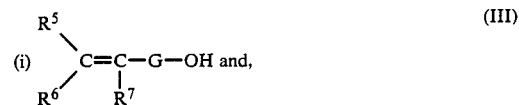
(III)

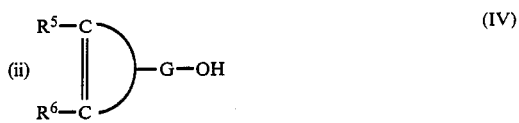
(IV)

wherein, G, if present, is a spacer selected from the group consisting of branched or linear alkyl, aralkyl, haloalkyl, haloaralkyl, alkoxyl and aralkoxy, each having from 1 to about 20 carbon atoms ($C_1$-$C_{20}$); and,
$R^5$, $R^6$ and $R^7$ are independently selected from the group consisting of hydrogen, $C_1$-$C_{20}$ alkyl (having from 1 to about 20 carbon atoms) and haloalkyl, and, $C_6$-$C_{20}$ aryl and aralkyl;

in the presence of an effective amount of
(C) a cationic initiator selected from the group consisting of Friedel-Crafts acids, relatively strong protic organic and inorganic acids, oxonium salts and stable carbenium ions;

so as to produce a macromer having the structure

$$R—(M)_m—OH \qquad (V)$$

wherein R represents the residue of said monoolefinically unsaturated alcohol,
M represents the residue of at least one said cyclic ether which is ring-opened, and,
m represents an integer in the range from 2 to about 500 with Mn=200–10,000.

2. The process of claim 1 wherein said ring-opened cyclic ether macromer is selected from the group consisting of
a homomacromer of said alkylene oxide (I) selected from the group consisting of a 1,2-epoxide, haloalkyl-1,2-epoxide, aliphatic glycidyl ether, aromatic glycidyl ether, and oxetane;
a macromer copolyether copolymer of tetrahydrofuran or oxepane with a comonomer selected from the group consisting of a 1,2-epoxide, a haloalkyl-1,2-epoxide, oxetane, an aliphatic glycidyl ether, and an aromatic glycidyl ether; and,
a macromer block copolyether of an alkylene oxide (I) selected from the group consisting of a 1,2-epoxide, a haloalkyl-1,2-epoxide, oxetane, an aliphatic glycidyl ether, and an aromatic glycidyl ether.

3. The process of claim 1 wherein said ring-opened cyclic ether macromer is selected from the group consisting of
a homomacromer of said alkylene oxide (I) selected from the group consisting of a 1,2-epoxide, haloalkyl-1,2-epoxide, aliphatic glycidyl ether, aromatic glycidyl ether, and oxetane;
a macromer copolyether copolymer of tetrahydrofuran or oxepane with a comonomer selected from the group consisting of a 1,2-epoxide, a haloalkyl-1,2-epoxide, oxetane, an aliphatic glycidyl ether, and an aromatic glycidyl ether;
a macromer block copolyether of an alkylene oxide (I) selected from the group consisting of a 1,2-epoxide, a haloalkyl-1,2-epoxide and oxetane, an aliphatic glycidyl ether, and an aromatic glycidyl ether.

4. The process of claim 3 wherein said monoolefinically unsaturated alcohol is selected from the group consisting of
(i) a monoolefinically unsaturated acyclic "allylic" alcohol having the structure (III) selected from the group consisting of (a) a relatively short chain alcohol having from 3 to about 6 carbon atoms including allyl alcohol, 2-methyl-2-propene-1-ol, 2-buten-1-ol, 1-buten-3-ol (1-methallyl alcohol), 3-buten-1-ol, 4-penten-1-ol, 2-pentene-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexene-1-ol, 2-methyl-1-penten-3-ol, 2-methyl-4-penten-3-ol, and 4-methyl-3-penten-1-ol; (b) a relatively long chain alcohol having from 7 to about 20 carbon atoms including 9-decen-1-ol, 10-undecen-1-ol, citronellol and oleyl alcohol; and, (c) arylalcohols in which the OH group is on the side-chain including cinnamyl alcohol, and those in which the OH group is a phenolic OH group including 2-allyl phenol;
(ii) allylic cyclic alcohols having the structure (IV) wherein the olefinic bond is in a single or fused ring structure having from 5 to 10 carbon atoms, including penten-1-ol, 2-cyclohexen-1-ol, 3-cyclohexen-1-methanol, 6,6-dimethyl bicyclo[3.3.1]hept-2-ene-2-ethanel[(IS)-(-)-Nopol], 5-norbornene-2-methanol, and bicyclo(2.2.2)oct-5-ene-2-methanol; and,
(iii) monoadducts of a single cyclic ether with the foregoing "allylic" alcohols, including a monoadduct with an alcohol selected from the group consisting of 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloromethyl ethyl allyl ether.

5. The process of claim 3 wherein said cationic initiator is selected from the group consisting of boron trifluoride (BF$_3$), boron trifluoride etherate complexes, tin tetrachloride (SnCl$_4$), a fluorinated metallic acid catalyst having the formula HMF$_6$ wherein M is selected from P, As or Sb; an oxonium salt of said acid and oxonium salts of tetrafluoroboron.

6. The process of claim 4 wherein said monoolefinically unsaturated alcohol is at least partially soluble in the reaction mass subjected to polymerization.

7. The process of claim 5 wherein polymerization is effected in the range from about 0° C. to about 150° C. and ambient pressure.

8. The process of claim 6 wherein said cationic initiator is present in an amount in the range from 0.001 part to about 1 part by wt per 100 parts by wt of said cyclic ether.

9. The process of claim 7 wherein said allylically ended macromer is a macromer block copolyether having the structure $$R-(M')_{m'}-(M'')_{m''}-OH \qquad (VI)$$

wherein M' and M" represent two ring-opened cyclic ethers, and, m' and m" are integers each in the range from 1 to about 300 such that m'+m"=m.

10. A polyether macromer having an allylic group at one end and a hydroxyl group at the other, formed by polymerizing
(A) a cationically ring-openable cyclic ether selected from the group consisting of
(i) at least one alkylene oxide having the structure

$$R_1-CH-(CH_2)_x-C-R^2 \qquad (I)$$
$$\phantom{R_1-CH-(CH_2)_x-}|\phantom{C-R^2}$$
$$\phantom{R_1-CH-(CH_2)_x-}R^3$$

wherein, x is an integer in the range from 0 to about 4, except that when x>1, a second alkylene oxide having x=1 or 0 must be present, and, R$^1$, R$^2$ and R$^3$ are independently selected from the group consisting of hydrogen, C$_1$-C$_{20}$ alkyl (having from 1 to about 20 carbon atoms) and haloalkyl, and, C$_6$-C$_{20}$ aryl and aralkyl, and, at least one of R$^1$, R$^2$, and R$^3$ is hydrogn; and,
(ii) an aliphatic or aromatic glycidyl ether having the structure

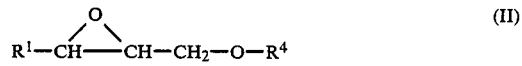

$$R^1-CH-CH-CH_2-O-R^4 \qquad (II)$$

wherein R$^1$ has the same connotation as hereinabove; and, R$^4$ represents a member selected from the group consisting of, C$_1$-C$_{20}$ alkyl or substituted alkyl, haloalkyl, alkenyl, substituted alkenyl, haloalkenyl, alkoxyalkyl, aryl (Ar), substituted aryl (Ar-Q), wherein Q is selected from the group consisting of C$_1$-C$_{10}$ alkyl, haloalkyl, C$_2$-C$_{10}$ alkenyl or haloalkenyl; and,
(B) a monoolefinically unsaturated primary or secondary alcohol represented by a structure selected from the group consisting of

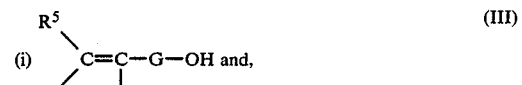

(i) $$\begin{array}{c}R^5\\ \phantom{R}\diagdown\\ \phantom{RRR}C=C-G-OH \text{ and,}\\ \phantom{RRR}/\phantom{=}|\\ R^6\phantom{\diagdown}\phantom{=}R^7\end{array} \qquad (III)$$

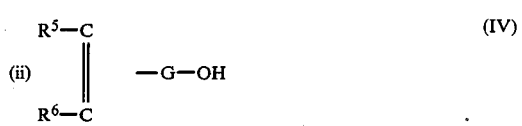

(ii) $$\begin{array}{c}R^5-C\\ \phantom{RR}\|\phantom{RR}-G-OH\\ R^6-C\end{array} \qquad (IV)$$

wherein, G, if present, is a spacer selected from the group consisting of branched or linear alkyl, aralkyl, haloalkyl, haloaralkyl, alkoxyl and aralkoxyl, each having from 1 to about 20 carbon atoms (C$_1$-C$_{20}$); and, R$^5$, R$^6$ and R$^7$ are independently selected from the group consisting of hydrogen, C$_1$-C$_{20}$ alkyl (having from 1 to about 20 carbon atoms) and haloalkyl, and, C$_6$-C$_{20}$ aryl and aralkyl;
in the presence of an effective amount of
(C) a cationic initiator selected from the group consisting of Friedel-Crafts acids, relatively strong protic organic and inorganic acids, oxonium salts and stable carbenium ions;
so as to produce a macromer having the structure

$$R-(M)_m-OH \qquad (V)$$

wherein R represents the residue of said monoolefinically unsaturated alcohol,

M represents the residue of at least one said cyclic ether which is ring-opened, and, m represents an integer in the range from 2 to about 500 with Mn=200–10,000;

whereby said macromer is produced in conjunction with at least a trace quantity of cyclic oligomer of said cyclic ether.

11. The polyether macromer of claim 10 which is a homomacromer having the structure

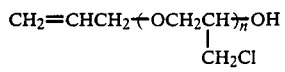
(VIII)

wherein n is in the range from 2 to about 100.

12. The polyether macromer of claim 10 after it has been aminated so that it has the structure

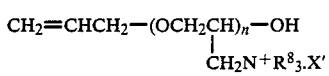
(XIII)

wherein X' represents a halogen, n is an integer in the range from 2 to 100, and $R^8$ represents the residue of an amine used to aminate the macromer.

* * * * *